(12) United States Patent
Kurmaniak et al.

(10) Patent No.: US 8,463,566 B2
(45) Date of Patent: Jun. 11, 2013

(54) ESTIMATION OF SOLENOID ACTUATOR FORCE PERFORMANCE BY ANALYSIS OF VOLTAGE AND CURRENT SIGNALS

(75) Inventors: Christopher V. Kurmaniak, Clarkston, MI (US); Thaddeus R. Kopp, Oakland Township, MI (US)

(73) Assignee: Borgwarner, Inc., Auburn Hills, MI (US)

( * ) Notice: Subject to any disclaimer, the term of this patent is extended or adjusted under 35 U.S.C. 154(b) by 655 days.

(21) Appl. No.: 12/694,436

(22) Filed: Jan. 27, 2010

(65) Prior Publication Data

US 2010/0198538 A1 Aug. 5, 2010

Related U.S. Application Data

(60) Provisional application No. 61/148,656, filed on Jan. 30, 2009.

(51) Int. Cl.
*G01R 11/00* (2006.01)
*G06F 11/30* (2006.01)

(52) U.S. Cl.
USPC ............. 702/64; 702/115; 702/182; 702/183

(58) Field of Classification Search
USPC .................. 702/65, 105, 113–121, 181–188, 702/33–38
See application file for complete search history.

(56) References Cited

U.S. PATENT DOCUMENTS

2006/0171091 A1* 8/2006 Seale et al. ..................... 361/160

* cited by examiner

*Primary Examiner* — Phuong Huynh
(74) *Attorney, Agent, or Firm* — Brinks Hofer Gilson & Lione

(57) ABSTRACT

A method of estimating force output of a solenoid assembly including a solenoid coil and a corresponding armature upon which the solenoid coil exerts a magnetic solenoid force is provided. The method includes a step of measuring a plurality of data points of current being drawn by the solenoid coil resulting in a plurality of measured current values, a step of measuring a plurality of data points of voltage being supplied to the solenoid coil resulting in a plurality of measured voltage values, and a step of estimating the magnetic solenoid force exerted upon the corresponding armature based on the pluralities of measured voltage and current values, resulting in an estimated force value.

24 Claims, 2 Drawing Sheets

ESTIMATION OF SOLENOID ACTUATOR FORCE PERFORMANCE BY ANALYSIS OF VOLTAGE AND CURRENT SIGNALS

BACKGROUND OF THE INVENTION

A solenoid is a coil of wire that provides a magnetic force when a current is passed through it. A solenoid can create controlled magnetic fields, and therefore, solenoids are often used as electromagnets to generate linear forces. Accordingly, a solenoid includes a fixed stator and a moving armature. Solenoids can be used in a variety of applications, such as in actively controlled couplings and differentials. In these types of applications, it is common to apply a known input to the solenoid to receive a predictable output force. However, one factor that affects the force output of a solenoid is the air gap present between the stator and the armature. For a solenoid used in an all-wheel drive (AWD) coupling, it has been difficult to measure or monitor the air gap directly. Therefore, is difficult to predict the input required to obtain desired outputs.

BRIEF SUMMARY OF THE INVENTION

In satisfying the above need, as well as overcoming the enumerated drawbacks and other limitations of the related art, the present invention provides methods of estimating force output and temperature of a solenoid coil, based on measuring values for the current being drawn by the solenoid coil and the voltage being applied to the solenoid coil.

In one aspect, a method of estimating force output of a solenoid assembly comprising a solenoid coil and a corresponding armature upon which the solenoid coil exerts a magnetic solenoid force is provided. The method includes measuring at least two data points of current being drawn by the solenoid coil and measuring at least two data points of voltage being supplied to the solenoid coil. The magnetic solenoid force exerted upon the corresponding armature is estimated based on the measured voltage and current values.

In another aspect, a method of estimating coil temperature of a solenoid coil having a corresponding armature upon which the solenoid coil exerts a magnetic solenoid force is provided. The method includes measuring at least two data points of current being drawn by the solenoid coil and measuring at least two data points of voltage being supplied to the solenoid coil. The temperature of the solenoid coil is estimated based on the pluralities of measured voltage and current values.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
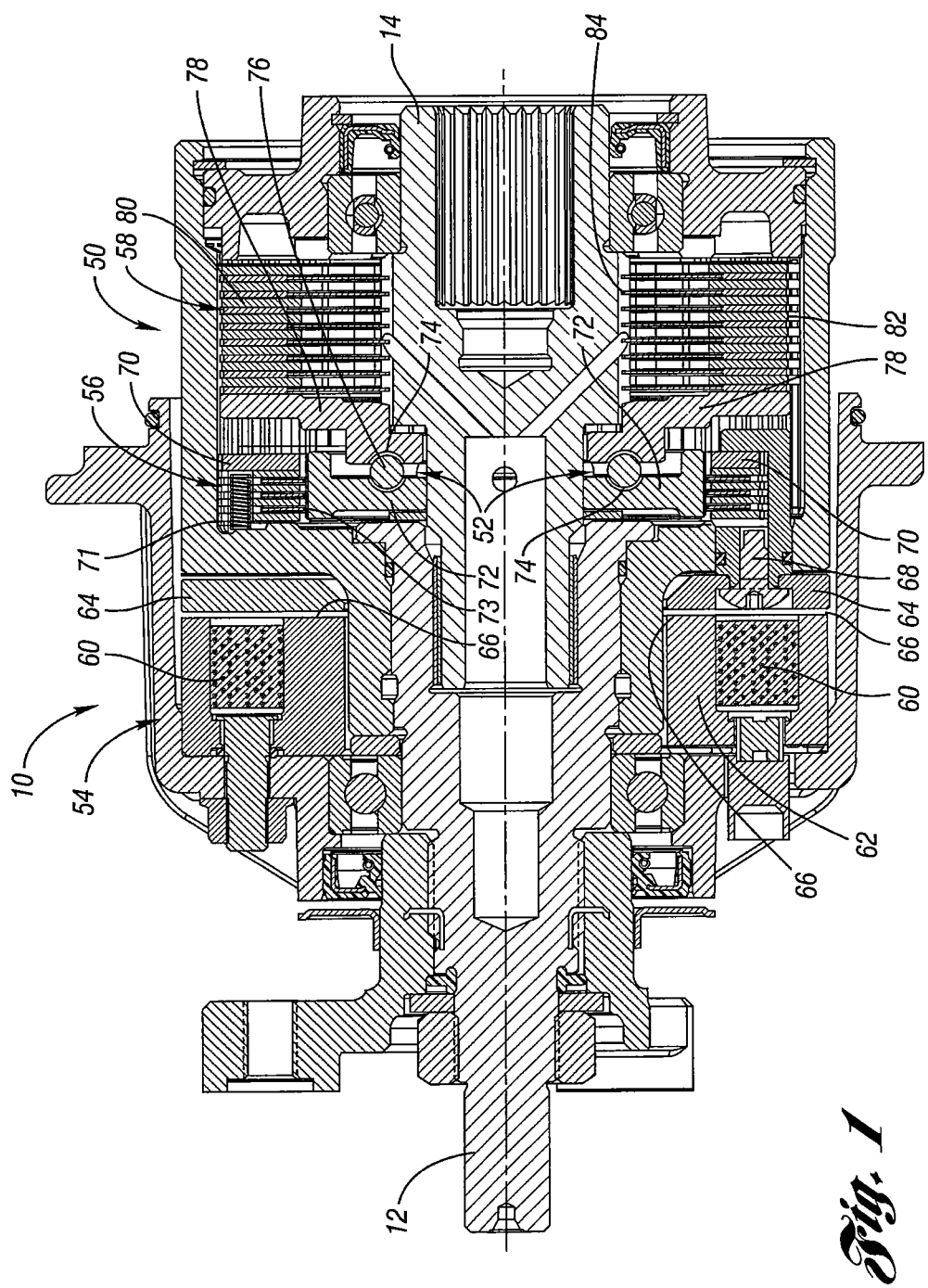
FIG. 1 is a cross-sectional view of a coupling including a solenoid assembly according to the principles of the present invention.

Referring now to FIG. 1, a coupling 10 for use in a motor vehicle is illustrated. The coupling 10 may be used to couple powertrain components or axles of a vehicle. As such, the coupling 10 has an input member 12 selectively coupled to an output member 14 by a modulating clutch assembly 50 having a ball ramp operator 52. The input member 12 may be disposed in a substantially coaxial relationship to the output member 14, as shown in FIG. 1, or the input and output members 12, 14, may be disposed in another relationship, such as a substantially perpendicular relationship. One example of a coupling device having one or more modulating clutch assemblies and including a ball ramp operator is disclosed in U.S. Pat. No. 6,905,008 to Kowalsky which is herein incorporated by reference in its entirety. Another example is disclosed in U.S. Pat. No. 5,839,328 to Showalter which is herein incorporated by reference in its entirety.

The modulating clutch assembly 50 selectively transfers torque from the input member 12 to the output member 14 by activating an electrical clutch operator 54 of the modulating clutch assembly 50. The electrical clutch operator 54 may be operable to engage a pilot clutch pack 56, as described below, or the pilot clutch pack 56 may be omitted, and the electrical clutch operator 54 may engage a main clutch pack 58 in any other suitable way.

The electrical clutch operator 54 may comprise a solenoid coil 60 surrounded by a coil housing 62, which may be energized to urge an annular solenoid armature 64 toward the left as illustrated in FIG. 1. As the solenoid urges the armature 64 to the left, the air gap between the solenoid coil 60 and the armature 64 becomes smaller, and the armature 64 contacts forward edges 66 of the coil housing 62. As the armature 64 moves to the left, it moves studs 68 to the left. The studs 68 are attached to a pressure plate 70, such that that when the studs 68 move to the left by virtue of the solenoid armature 64 moving to the left, the pressure plate 70 moves to the left to compress the pilot clutch pack 56. The pilot clutch pack 56 has a first plurality of clutch plates 71 coupled to the input member 12 and a second plurality of clutch plates 73 coupled to a clutch hub 72.

Upon being compressed, the pilot clutch pack 56 engages the ball ramp operator 52 to transfer torque between the input and output members 12, 14 through the pilot and main clutches 56, 58. More particularly, the clutch hub 72 is freely rotatably disposed upon the output member 14. A plurality of ramped recesses 74 is disposed in a circular pattern about the axis of the output member 14. Disposed within the recesses 74 are load transferring members, such as ball bearings 76 or similar components, which roll along the ramps defined by the recesses 74. An annular member 78 is disposed in opposed relation with the clutch hub 72 and includes a like plurality of complimentary sized recesses 74. Upon compression of the pilot clutch pack 56, the clutch hub 72 is pulled away from the annular member 78, causing the ball bearings 76 to ride up the recesses 74. As the ball bearings 76 ride up the recesses 74, the clutch hub 72 and the annular member 78 are driven apart. When the annular member 78 is driven away from the clutch hub 72, the annular member 78 acts as an apply plate to compress the main clutch pack 58.

Upon compression, the main clutch pack 58 transfers torque to the output member 14. More specifically, the main clutch pack 58 comprises a plurality of interleaved clutch plates 80. A first plurality 82 of the clutch plates 80 is coupled to the input member 12, either by being directly coupled or selectively coupled, for example by virtue of the pilot clutch pack 56 described above. A second plurality 84 of clutch plates 80 is coupled to the output member 14. When compressed, the first and second pluralities 82, 84 of clutch plates 80 rotate together, and the main clutch pack 58 thereby couples the input member 12 to the output member 14.

The coupling 10 could have many other appropriate configurations not necessarily including a ball ramp operator and primary and secondary clutch packs, without falling beyond the spirit and scope of the present invention. Other examples include, but are not limited to, electromechanical devices and electrohydraulic devices. For example, the clutch assembly 50 could be a single stage clutch with the force applied by a cylinder piston arrangement. The coupling 10 may include any appropriate electric motor configured to mechanically compress the clutch plates 80, without falling beyond the spirit and scope of the present invention. An electrohydraulic device may include an electric pump and/or an electrically actuated valve to hydraulically compress the clutch plates 80.

Further the solenoid coil 60, coil housing 62, and armature 64 may have other appropriate configurations without falling beyond the spirit and scope of the present invention. For example, the housing 62 and armature 64 could have frustoconical surfaces, such as those disclosed in U.S. Pat. No. 6,905,008 to Kowalsky et al., which has been incorporated by referenced in its entirety above.

Figure 2:
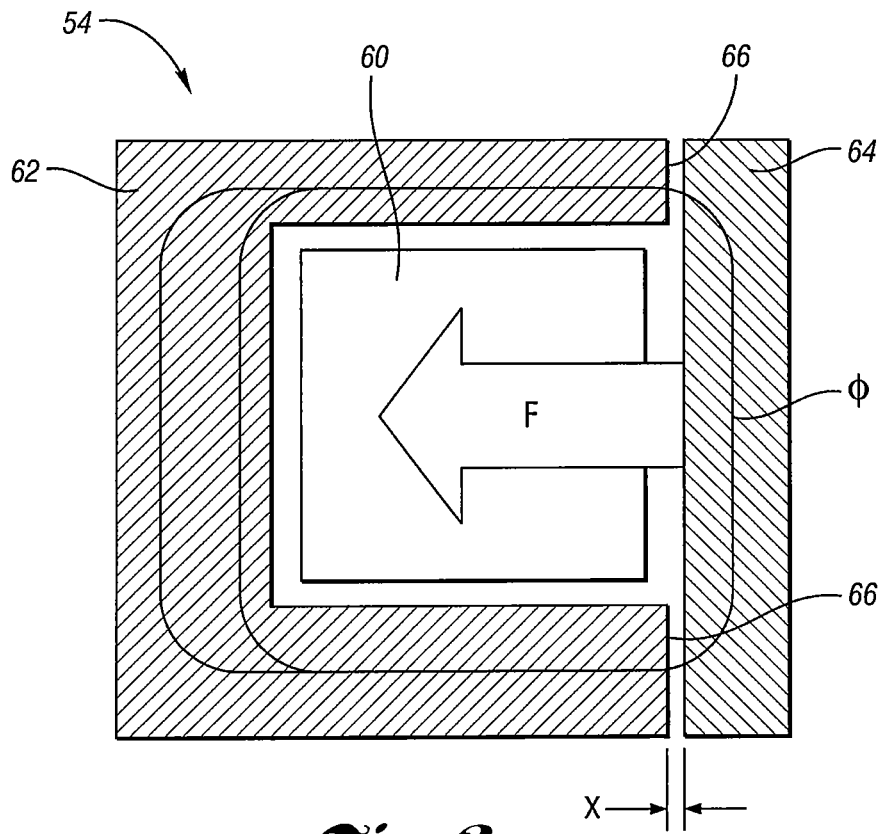
FIG. 2 is a schematic cross-sectional view of the solenoid assembly of FIG. 1, in accordance with the principles of the present invention.

Now with reference to FIG. 2, a close-up of the electromagnetic actuator 54 is illustrated, including the solenoid 60, the solenoid housing 62, and the armature 64. As stated above, the armature 64 may be connected to studs 68 and a pressure plate 70, or the armature 64 could transfer force in any other suitable way. Further, the armature 64 may be annular, as shown in cross-section in FIG. 1, or the armature 64 may be linear, or it may have any other suitable shape, without falling beyond the spirit and scope of the present invention.

When supplied with an electric current, the solenoid coil 60 produces a magnetic field, the strength of which is referred to as the magnetic flux φ. When an N-turn coil carrying a current i is wound around a magnetic core, the magnetomotive force (mmf) F generated by the coil produces a flux φ that is mostly concentrated within the core and is assumed to be uniform across the cross-section of the core. With reference to FIG. 2, the solenoid coil 60 is shown producing a magnetic flux φ.

When a magnetic flux φ is produced, a magnetic force f acts upon the armature 64 to attract the armature 64 toward the coil housing 62 and close the air gap x between the armature 64 and the coil housing 62. The magnetic force f acting upon the armature 64 is given by the equation:

$$f = \frac{\phi^2}{2A\mu_0} \tag{1}$$

where f is the magnetic force acting upon the armature 64, φ is the magnetic flux, A is the cross-sectional area of the magnetic core (in this case, the portions of the solenoid housing 62 that contact the armature 64), and $\mu_0$ is the permeability constant whose value is:

$$\mu_0 = 4\pi \times 10^{-7} T \cdot m/A \tag{2}$$

The magnetic flux is related to the magnetic Reluctance R as follows:

$$N \cdot i = R(x) \cdot \phi \tag{3}$$

where N is the number of turns in the solenoid coil 60, i is the current being drawn by the solenoid coil 60, R(x) is the magnetic Reluctance, which is a function of the air gap x, and φ is the magnetic flux. Solving for magnetic flux in equation (3), the magnetic force f may be related directly to the magnetic Reluctance R(x):

$$f = \frac{\left(\frac{N \cdot i}{R(x)}\right)^2}{2A\mu_0}. \tag{4}$$

If a current i is established in the turns of a solenoid coil, the current produces a magnetic flux φ through the central region of the solenoid coil 60, as stated above. Thus, the solenoid coil 60 is an inductor, and the inductance L of the inductor is given by:

$$L = \frac{N \cdot \phi}{i} \tag{5}$$

where L is the inductance, N is the number of turns in the solenoid coil 60, φ is the magnetic flux, and i is the current drawn by the solenoid coil 60. In any inductor, a self-induced electromotive force (emf) $\epsilon_L$ appears whenever the current changes with time, which may be expressed in a measurement of Volts. In other words, the rate of change of the current affects the value of the self-induced emf $\epsilon_L$. The self-induced emf $\epsilon_L$ opposes the rise of the current, and thus, it opposes the emf ε of the voltage source in a circuit. Faraday's law defines emf ε as follows:

$$\varepsilon = -\frac{d\phi}{dt} \tag{6}$$

where ε is emf and dφ/dt is the change in magnetic flux over time. If the magnetic flux through a coil of N turns is changed, an induced emf appears in every turn and the total emf induced in the coil is the sum of the individual induced emfs. If the coil is tightly wound so that the same magnetic flux φ passes through all the turns, the total emf induced in the inductor is:

$$\varepsilon_L = -N\frac{d\phi}{dt} \tag{7}$$

where $\epsilon_L$ is the emf of the inductor, N is the number of turns in the coil, and dφ/dt is the change in magnetic flux over time. Substituting in the equivalents from equation (5), the inductor emf $\epsilon_L$ may be expressed as:

$$\varepsilon_L = -L\frac{di}{dt} \tag{8}$$

where $\epsilon_L$ is the emf of the inductor, L is the inductance, and di/dt is the change in current over time. Combining equations (7) and (8) allows the flux φ to be related to inductance L and the change in current di/dt:

$$N\frac{d\phi}{dt} = L\frac{di}{dt}. \tag{9}$$

Figure 3:
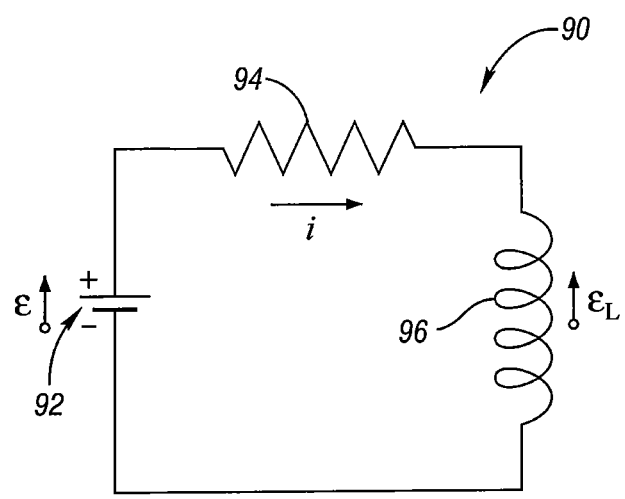
FIG. 3 is a schematic diagram of an RL circuit representing the circuit of the solenoid assembly of FIGS. 1 and 2.

Thus, in an RL circuit, a self-induced emf $\epsilon_L$ appears in the circuit due to the inductor, and opposes the emf ε of the voltage source. Assuming that the circuit including the solenoid coil 60 may be modeled after an RL circuit having a voltage source and some resistance, a simple RL circuit can be used to estimate the system parameters. With reference to FIG. 3, an RL circuit 90 has a voltage source 92, a resistor 94, and an inductor 96. Applying Kirchoff's voltage law, the following equation is obtained from the RL circuit 90:

$$\varepsilon = L\frac{di}{dt} + R \cdot i \tag{10}$$

where $\varepsilon$ is the emf, in Volts, supplied by the voltage source 92, L is the inductance, di/dt is the change in current over time, R is the resistance, and i is the current being drawn. It is assumed that electrical resistance R is unchanged by a change in the air gap x, and inductance L is a function of the air gap x and can be a function of temperature and voltage.

It can be seen from the previous equations that if certain system parameters can be measured or estimated, the magnetic flux $\phi$ and the magnetic force f can be calculated. More specifically, the voltage $\varepsilon$ applied to the solenoid coil 60 and the current i being drawn by the solenoid coil 60 can be measured. The current i may be measured with a current probe, by way of example. A current sensor could be located on a controller, among other places. If several values for voltage $\varepsilon$ and current i are measured over time, equation (10) can be used to estimate the resistance R and the inductance L of the solenoid coil 60. A method of linear differentiation, such as the finite difference method, may be used to estimate the values for R and L, if desired. Once the values for R, L, i, and applied voltage ($\varepsilon$) are determined, other parameters of interest may be calculated, such as Reluctance R(x) and magnetic force f, by applying equations (1)-(5), for example. Thus, the present invention contemplates measuring applied voltage $\varepsilon$ and drawn current i, over a period of time, to determine the magnetic solenoid force f acting on the armature 64 at any data point in time. Therefore, an approximate value of the magnetic force f can be estimated at any point in time, and the duty cycle can be adjusted to provide the desired magnetic solenoid force f. In other words, if the voltage $\varepsilon$ applied to the solenoid coil 60 is a pulse-width modulated (PWM) voltage, the duty cycle or frequency of the PWM voltage may be adjusted to affect the force f. In other embodiments, the applied voltage $\varepsilon$ could be variable, in which case the level of the applied voltage could be increased or decreased to affect the force f.

It should be understood that as the armature 64 moves away from the solenoid coil 60, the air gap x will increase, and the amount of the magnetic force f that the armature 64 can transfer to compress the pilot clutch pack 56 will decrease. Thus, estimating the magnetic force f based on the electrical parameters of the solenoid system will allow voltage to be applied for a longer period of time, if necessary, in a system that uses a pulse-width modulated applied voltage; in other words, the duty cycle may be modified by a controller to alter the magnitude of the magnetic force f.

In typical constructions of solenoids previously described, the air gap between the armature and coil is variable. In addition L is strongly affected by this variable air gap construction. Consequently, it is of interest to construct representations of L and indirectly F that are compatible with calibration methods that either closely match the physics of L or provide ease in computation F.

The magnetic force f and the inductance L may be directly related by combining equations (1) and (5) to arrive at the following relationship:

$$f = \frac{L^2 \cdot i^2}{N^2 \cdot 2 \cdot A \cdot \mu_0} \tag{11}$$

where f is the magnetic force of the solenoid 60 acting upon the armature 64, L is the inductance, i is the current being drawn by the solenoid 60, N is the number of coil turns, A is the is the cross-sectional area of the magnetic core (in this case, the portions of the solenoid housing 62 that contact the armature 64), and $\mu_0$ is the permeability constant whose value is given by equation (2). As stated above, the current i may be measured, and the inductance L may be calculated from equation (10), or in any other suitable way, and since the rest of the variables in equation (11) are constant, the magnetic solenoid force f may be determined. Thus, the force f may be estimated at any data point without actually measuring the force f. In brief, the magnetic solenoid force f is estimated solely from the electrical parameters of the solenoid system.

As stated above, the values of N, A, and $\mu_0$ in equation (11) will be constant for a given solenoid 60, coil housing 62, and armature 64. Thus, equation (11) may be re-written as:

$$f = c \cdot L^2 \cdot i^2 + c_0 \tag{12}$$

where f is the magnetic force of the solenoid 60 acting upon the armature 64, c and $c_0$ are constants based on all of the constant parameters of the system, L is the inductance if the solenoid coil 60, and i is the current being drawn by solenoid 60. Since the values of the constants of equation (11) may be difficult to determine in an actual solenoid coil 60, the constants c and $c_0$ may be determined by calibrating the solenoid system before use. As stated earlier, inductance can be a function of temperature and voltage.

Model parameters including the constants c and $c_0$ and the inductance L, which may be a function of air gap, temperature, and voltage, may be determined using a calibration procedure. The calibration procedure may be employed to calibrate the solenoid 60, which uses a force sensor to measure force f. Further, the calibration procedure can include measuring applied voltage $\varepsilon$ and the drawn current i. The air gap x may be increased 10-12 times to collect data at different air gaps x, preferably starting at the minimum air gap x and ending at the maximum air gap x. The inductance L may be determined by any suitable method, for example, by using a finite difference method to solve for resistance R and inductance L in equation (10). One way to solve for resistance R and inductance L is to use a least squares curve fit of resistance R and inductance L to the voltage $\varepsilon$ and current i data. Thereafter, the measured values of force f may be plotted as a function of $L^2 i^2$, and the constants c and $c_0$ may be determined from the graph to complete equation (12). After the constants c and $c_0$ are determined, equation (12) may be programmed into a controller, such an electronic control unit (ECU), to determine future values of force f. Then, for a solenoid system used in a production part, only voltage $\varepsilon$ and current i need to be measured to calculate force f. In other words, the force sensor is only used for calibrating the controller, and the force sensor is not used in each production part. Ideally, the constants c and $c_0$ may be measured for several solenoid systems having the same model of solenoid coils 60, and the average constants c, $c_0$ may be implemented for production controllers.

In another variation, a linear shape function of L(x), based on variation of the air gap x, may be employed to compute the magnetic force f. This may involve estimating the air gap x to determine the magnetic force f acting upon the armature 64. Since the inductance L is a function of air gap x, the response time of the current i is also sensitive to the air gap x. The inductance L may be determined initially from measuring the current i and voltage ε, and using equation (10) to determine data points for inductance L and resistance R, as explained above. Further, the air gap x may be determined by initial calibration steps similar to those described above with regard to the force calculation. Thus, in the calibration steps, the air gap x is initially measured using a linear displacement measuring device, such as a linear variable differential transformer (LVDT). Since the inductance L is a function of the air gap x, the estimated data points of inductance L (based on the measured current i and voltage ε) may be plotted as a function of the measured air gap x data points to obtain model parameters. A curve may then be fit to the data points for inductance L and air gap x. The relationship of the inductance L and air gap x may be approximated using a curve fit, such as a linear model, an inverse model, an exponential model, or possibly other polynomial models. If a linear curve is used, the following relationship may be used to explain the correlation between the inductance L and air gap x:

$$L = c_1 x + c_2 \quad (13)$$

where L is the inductance, x is the air gap, and $c_1$ and $c_2$ are constants describing the relationship between inductance L and air gap x, if a linear model is used. If an inverse model is used, the following equation may be used to explain the correlation between the inductance L and air gap x:

$$L = \frac{c_3}{x} + c_4 \quad (14)$$

where L is the inductance, x is the air gap, and $c_3$ and $c_4$ are constants determined from plotting several data points for inductance L as a function of the measured air gap x and fitting the same to an inverse curve. If an exponential model is used, the following equation may be used to explain the correlation between the inductance L and the air gap x:

$$L = c_5 e^{c_6 \cdot x} \quad (15)$$

where L is the inductance, x is the air gap, and $c_5$ and $c_6$ are constants determined from plotting several data points for inductance L as a function of air gap x and fitting the same to an exponential curve. Another way to view the solution of these equations is to combine equations (10) and (13), for example, which results in the following equation:

$$\varepsilon = R \cdot i + (c_2 + c_1 \cdot x) \frac{di}{dt}. \quad (16)$$

Then, the finite difference method, for example, may be used to extract the system parameters of resistance R and the constants $c_2$ and $c_1$, based on measurements of applied voltage ε, drawn current i, and air gap x. After the constants $c_2$ and $c_1$ have been determined for a particular solenoid model, equation (16) can be programmed into a controller of a production solenoid system that lacks a linear displacement measurement device. In the production part, measurements of current i and voltage ε alone may be used to determine the resistance R and the air gap x, because the constants $c_2$ and $c_1$ were determined during the calibration procedure. Further, the controller could solve for the inductance L using, for example, equation (13).

The magnetic force f may be estimated by initially employing calibration steps, which involve measuring force f with a force sensor as described above, along with measuring current i, voltage ε, and air gap x. Data points for force f as a function of air gap x and current i may be plotted and fit to a three-dimensional curve. The following equation represents the three-dimensional curve:

$$f = C_A + x \cdot C_B + i \cdot C_c + x \cdot i \cdot C_D + x^2 \cdot C_E + i^2 \cdot C_F \quad (17),$$

where
i is the measured value of the current being drawn by the solenoid 60, x is the measured air gap, f is the magnetic force of the solenoid 60 acting upon the armature 64, and $C_A$, $C_B$, $C_C$, $C_D$, $C_E$, and $C_F$ are constants based on average values obtained from estimating the electrical parameters of a solenoid coil 60, or preferably many solenoid coils 60, each being the same particular model. Since the force f, air gap x, and current i are each measured in the calibration steps, the constants $C_A$, $C_B$, $C_c$, $C_D$, $C_E$, and $C_F$ may be determined from linear differentiation, such as the finite difference method, or in other words, the constants of the plotted curve are determined. After the constants $C_A$, $C_B$, $C_C$, $C_D$, $C_E$, and $C_F$ are determined, the equation (17) may also be programmed into the controller, along with equation (16), such that in a production solenoid system, the controller is able to calculate the air gap x based on voltage ε and current i measurements using equation (16) with the constants determined, and further the controller is able to calculate the force f, based on the measured current i and the estimated air gap x, using equation (17) with the constants determined. Thus, the controller can determine the force f based on the electrical parameters of the system, without measuring force f on the production part. If the controller is able to determine the force f at any given point in time, the controller may be configured to alter the duty cycle of the solenoid system in order to affect the force f, to bring the force f to a desired level, as explained above.

In the alternative, if the air gap x is estimated by the controller using equation (16) with determined constants, the force f may be estimated in any other suitable way, such as by applying equations (13) and (11). Further, the electrical parameters, such as the inductance L, may be determined in any suitable manner without falling beyond the spirit and scope of the present invention.

The system and method of the present invention also contemplates calculating or estimating the temperature of the solenoid coil 60 based on the electrical parameters of the system. Knowing the temperature of the solenoid coil 60 may be important to estimate the performance of other parts of the clutch assembly 50. For example, the torque produced by the clutch pack 58 is reduced with increased temperature.

The Applicants have determined that the temperature of the solenoid coil 60 is directly proportional to the resistance R. The resistance R may be determined in any suitable manner, which may include measuring several data points over time of the current i being drawn by the solenoid coil 60 and the voltage ε being applied to the solenoid coil 60 and applying equation (10) to determine the resistance R of the solenoid coil 60. Thereafter, calibration steps similar to those described above may be used to initially calibrate the controller. More particularly, in a calibration setting, a temperature sensor is used to measure the temperature T of the solenoid coil 60 at several points over time, along with the current i and voltage ε measurements. Temperature T may be then be plotted as a function of the resistance R. A linear curve may be fit to the temperature/resistance data points, which may be described by the following equation:

$$T = c_7 \cdot R + c_8 \quad (18)$$

where T is the temperature of the solenoid coil 60, R is the resistance of the solenoid coil 60, and $c_7$ and $c_8$ are the constants of the temperature-resistance curve. Once $c_7$ and $c_8$ are determined by, for example, by measuring/estimating several data points for temperature T and resistance R over time and using the finite difference method to solve for the constants $c_7$ and $c_8$, equation (18) may be programmed into the controller with the constants determined, and in production solenoid systems, equation (18) may be used to determine the temperature T of the solenoid coil 60 at any point in time, based on the resistance R. Therefore, a temperature sensor is not needed to determine the temperature T of the solenoid coil 60 in the production parts.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A method of estimating force output of a solenoid assembly having a solenoid coil and a corresponding armature upon which the solenoid coil exerts a magnetic solenoid force, the method comprising:
   providing the solenoid coil and the corresponding armature;
   measuring a plurality of calibration data points of magnetic solenoid force resulting in a plurality of measured calibration force values;
   measuring a plurality of calibration data points of current being drawn by the solenoid coil resulting in a plurality of measured calibration current values;
   measuring a plurality of calibration data points of voltage being supplied to the solenoid coil resulting in a plurality of measured calibration voltage values;
   estimating a plurality of model parameters of the solenoid coil based on the measured calibration voltage and current values resulting in a plurality of estimated model parameters;
   measuring a plurality of data points of current being drawn by the solenoid coil resulting in a plurality of measured current values;
   measuring a plurality of data points of voltage being supplied to the solenoid coil resulting in a plurality of measured voltage values; and
   estimating the magnetic solenoid force exerted upon the corresponding armature based on the pluralities of measured voltage and current values, resulting in an estimated force value.

2. The method of claim 1, further comprising a step of estimating the inductance of the solenoid coil based on the pluralities of measured voltage and current values.

3. The method of claim 1, further comprising a step of estimating the resistance of the solenoid coil based on the pluralities of measured voltage and current values.

4. The method of claim 1, further comprising a calibration step of plotting the measured calibration force values as a function of the measured calibration current values and the estimated model parameters resulting in a calibration curve.

5. The method of claim 4, further comprising programming the calibration curve into a controller.

6. The method of claim 5, further comprising adjusting a duty cycle of the solenoid coil to adjust the estimated force value.

7. The method of claim 4, further comprising adjusting the voltage applied to the solenoid coil to adjust the estimated force value.

8. The method of claim 1, wherein the step of estimating magnetic solenoid force exerted upon the corresponding armature based on the measured voltage and current values is accomplished without directly measuring magnetic solenoid force exerted upon the corresponding armature.

9. The method of claim 1, wherein the calibration step of estimating model parameters includes estimating a plurality of data points of calibration inductance of the solenoid coil basted on the measured calibration voltage and current values resulting in a plurality of estimated calibration inductance values.

10. The method of claim 9, further comprising a calibration step of plotting the measured calibration force values as a function of the measured calibration current values and the estimated calibration inductance values.

11. The method of claim 10, wherein the calibration step of estimating a plurality of data points of calibration inductance of the solenoid coil based on the measured calibration voltage and current values includes estimating the calibration inductance using a finite difference method.

12. The method of claim 5, further comprising the step of providing a solenoid housing, wherein the solenoid coil, the solenoid housing, and the armature each have an annular configuration.

13. The method of claim 5, further comprising the step of providing an electrical clutch operator, wherein the solenoid coil is part of the electrical clutch operator.

14. The method of claim 13, wherein the electrical clutch operator further comprises a clutch pack and a pressure plate, the pressure plate being movable by the armature to compress the clutch pack.

15. The method of claim 14, further comprising the step of providing an all-wheel-drive coupling, wherein the solenoid coil is part of the all-wheel-drive coupling.

16. A method of estimating force output of a solenoid assembly having a solenoid coil and a corresponding armature upon which the solenoid coil exerts a magnetic solenoid force, the method comprising:
   providing the solenoid coil and the corresponding armature;
   measuring a plurality of calibration data points of magnetic solenoid force resulting in a plurality of measured calibration force values;
   measuring a plurality of calibration data points of current being drawn by the solenoid coil resulting in a plurality of measured calibration current values;
   measuring a plurality of calibration data points of voltage being supplied to the solenoid coil resulting in a plurality of measured calibration voltage values;
   measuring a plurality of calibration data points of an air gap between a housing of the solenoid coil and the armature resulting in a plurality of measured calibration air gap values;
   estimating a plurality of data points of calibration inductance of the solenoid coil based on the measured calibration voltage and current values resulting in a plurality of estimated calibration inductance values;
   plotting the measured calibration air gap values as a function of the estimated calibration inductance values resulting in an air gap calibration curve;
   plotting the measured calibration force values as a function of the measured calibration current values and the estimated calibration air gap values resulting in a force calibration curve;

measuring a plurality of data points of current being drawn by the solenoid coil resulting in a plurality of measured current values;

measuring a plurality of data points of voltage being supplied to the solenoid coil resulting in a plurality of measured voltage values;

estimating a solenoid coil air gap based on the measured current and voltage values resulting in an estimated solenoid coil air gap; and estimating the magnetic solenoid force exerted upon the corresponding armature based on the measured voltage and current values and the estimated solenoid coil air gap, resulting in an estimated force value.

17. The method of claim 16, further comprising programming the air gap and force calibration curves into a controller.

18. The method of claim 17, further comprising adjusting a duty cycle of the solenoid coil to adjust the estimated force value.

19. The method of claim 17, further comprising adjusting the applied voltage to the solenoid coil to adjust the estimated force value.

20. A method of estimating force output of a solenoid assembly having a solenoid coil and a corresponding armature, the method comprising:

providing the solenoid coil and the corresponding armature;

measuring a plurality of calibration data points of magnetic solenoid force resulting in a plurality of measured calibration force values;

measuring a plurality of calibration data points of current being drawn by the solenoid coil resulting in a plurality of measured calibration current values;

measuring a plurality of calibration data points of voltage being supplied to the solenoid coil resulting in a plurality of measured calibration voltage values;

determining electrical parameters of the solenoid system during operation; and estimating the force output of the solenoid coil at a given point in time during operation, based on electrical parameters of the solenoid system.

21. A method of estimating coil temperature of a solenoid coil having a corresponding armature upon which the solenoid coil exerts a magnetic solenoid force, the method comprising:

providing the solenoid coil and the corresponding armature;

measuring a plurality of data points of current being drawn by the solenoid coil resulting in a plurality of measured current values;

measuring a plurality of data points of voltage being supplied to the solenoid coil resulting in a plurality of measured voltage values; and estimating the temperature of the solenoid coil based on the pluralities of measured voltage and current values, resulting in an estimated temperature value.

22. The method of claim 21, further comprising a step of estimating the resistance of the solenoid coil based on the pluralities of measured voltage and current values.

23. The method of claim 21, further comprising:

a calibration step of measuring a plurality of calibration data points of solenoid temperature resulting in a plurality of measured calibration temperature values;

a calibration step of measuring a plurality of calibration data points of current being drawn by the solenoid coil resulting in a plurality of measured calibration current values;

a calibration step of measuring a plurality of calibration data points of voltage being supplied to the solenoid coil resulting in a plurality of measured calibration voltage values;

a calibration step of estimating a plurality of data points of calibration resistance of the solenoid coil based on the measured calibration voltage and current values resulting in a plurality of estimated calibration resistance values; and a calibration step of plotting the measured calibration temperature values as a function of the estimated calibration resistance values resulting in a calibration curve.

24. The method of claim 23, further comprising programming the calibration curve into a controller.

* * * * *